United States Patent [19]

Hilborn et al.

[11] Patent Number: 4,625,200
[45] Date of Patent: Nov. 25, 1986

[54] HEAT DETECTION SYSTEM

[75] Inventors: Howard L. Hilborn, Houston; Michael Strebel, Pasadena, both of Tex.

[73] Assignee: Gay Engineering & Sales Co., Inc., Pasadena, Tex.

[21] Appl. No.: 690,316

[22] Filed: Jan. 10, 1985

[51] Int. Cl.⁴ .................. G08B 17/06; G01K 1/14
[52] U.S. Cl. .................................. 340/596; 374/179
[58] Field of Search ............ 340/596; 374/179; 136/235

[56] References Cited

U.S. PATENT DOCUMENTS 3,967,256  6/1976  Galatis ..................... 340/596 X
4,453,159  6/1984  Huff et al. ................. 340/596 X
4,490,053  12/1984  Coston et al. ............. 340/596 X Primary Examiner—James L. Rowland
Assistant Examiner—Anne Marie F. Capati
Attorney, Agent, or Firm—Robert W. B. Dickerson

[57] ABSTRACT

A heat detection system comprised of a length of thermocouple cable positioned proximate to the area to be controlled, said cable having the capacity to detect hot spots or areas, said cable being electrically connected to a plurality of transmitters for generating signals as a function of excessive temperature and/or line break, said transmitters, in turn, being electrically connected to one or more of a plurality of alarms adapted to indicate said excessive temperature and/or line break.

2 Claims, 4 Drawing Figures

HEAT DETECTION SYSTEM

BACKGROUND OF THE INVENTION

It has long been a desired and necessary goal to continuously monitor the temperature of storage tanks, particularly those containing flammable and/or combustible materials, such as petroleum products or a wide variety of chemicals. A standard tool used in such measurements has a thermocouple assembly, having wires of dissimilar material which generate a voltage as a function of the temperature around a junction of said wires. Inasmuch as a fire, or excessive temperature, may commence or occur at almost any location in the tank, it is advantageous to determine such occurrence substantially throughout the tank. Rather than provide a plethora of thermocouple junctions, this invention attacks the problem by using a substantially continuous thermocouple cable which is capable of generating a voltage as a function of the highest temperature occurring along its length.

SUMMARY OF THE INVENTION

A length or lengths of thermocouple cable is formed into one or more loops and positioned atop a storage tank's floating roof, preferably near its peripheral seal. Such loop comprises alternating sections of continuous thermocouple transducer cable and thermocouple compatible extension wire, adjacent sections being connected by transition members. The wires from one end of said cable are electrically connected to an alarm, through a transmitter, to generate an alarm signal if a temperature is detected in excess of a specified level. Opposite ends of each of the pair of cable wires is electrically connected to separate alarm, through separate transmitters, to generate an alarm signal if there is a wire break in either of said wires.

DESCRIPTION OF A PREFERRED EMBODIMENT

Figure 1:
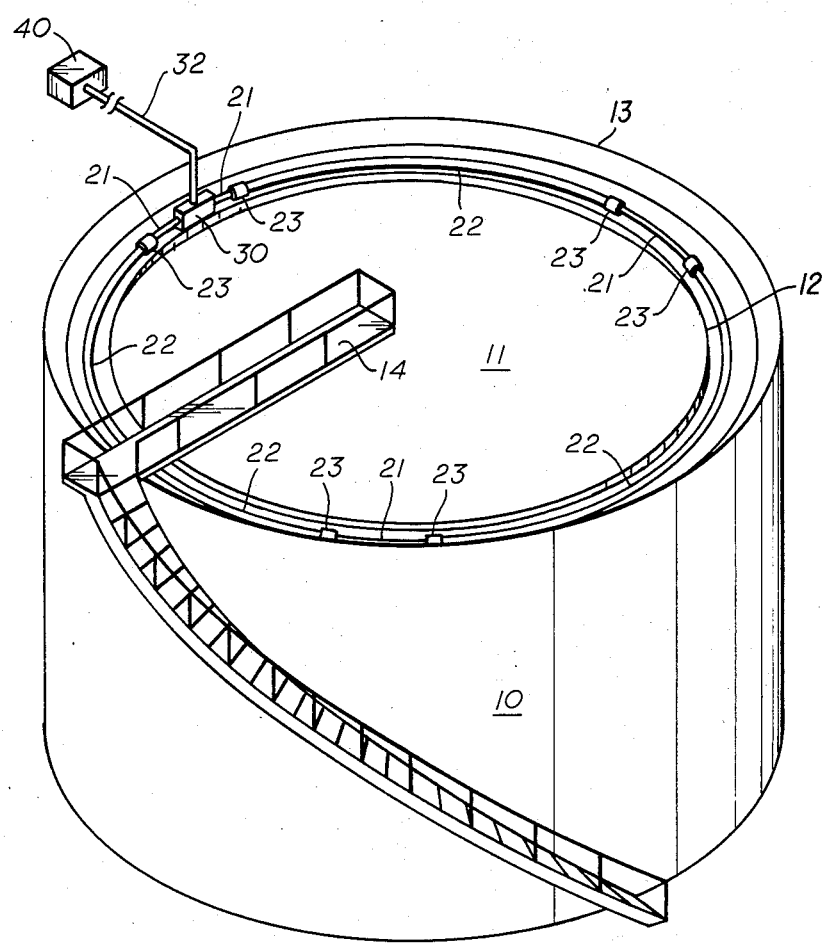
FIG. 1 is a partly broken, perspective of the fire detection system in place, parts being shown schematically.

Looking first at FIG. 1, a typical storage tank 10 is shown, the tank having a floating roof 11. A fire wall 12 is provided the roof, radially interior of its peripheral seal with vertical wall 13 of tank 10. Access to roof 11, and the fire detection system, would be by way of floating roof ladder 14.

Figure 2:
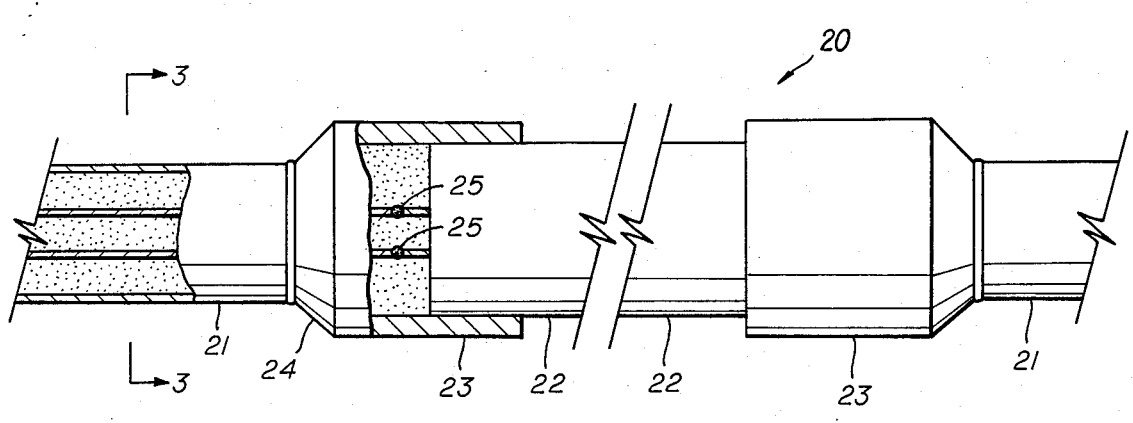
FIG. 2 is an enlarged, broken elevation of a length of the thermocouple cable depicted in FIG. 1.
Figure 3:
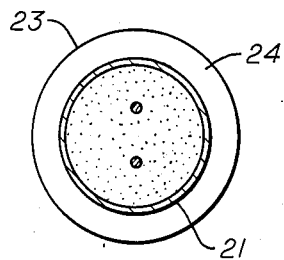
FIG. 3 is an end view, in the direction of arrows 3, of the transition coupling shown especially in FIG. 2.
Figure 4:
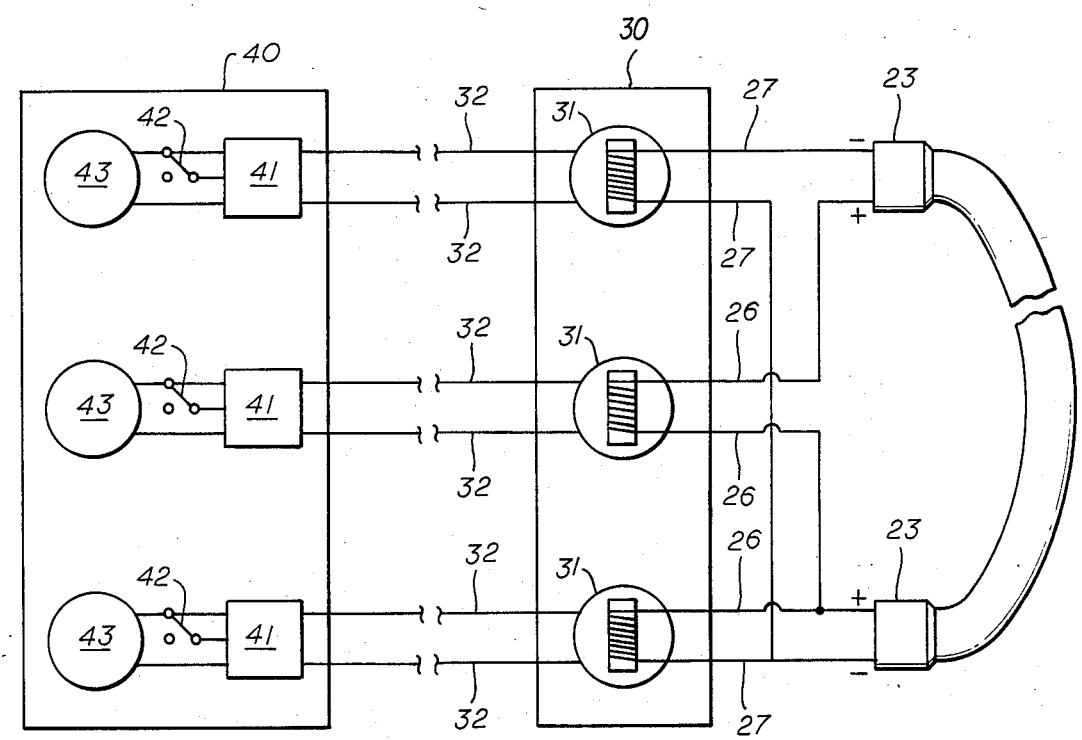
FIG. 4 is a schematic diagram of electronics utilized.

The purpose of the invention is to determine the existence of an excessively high temperature within the tank, such as caused by fire, or near flammable conditions, and to emit a signal as a function thereof. The temperature determining structure comprises a thermocouple cable, generaly indicated by numeral 20 in FIG. 2. Said cable would normally be positioned in the form of a loop, around floating roof 11, intermediate fire wall 12 and the seal between said roof and tank wall 13. Smaller loops positioned at a plurality of roof locations could be used. Cable 20 is comprised of 3 basic elements, namely continuous thermocouple transducer cable 21, intermediate thermocouple extension wire section 22, and transition elements 23 linking each adjacent members 21, 22. Member 21 may be of the type manufactured by Xco International Inc., and marketed under the trademark $CT^2C$. Basically it comprises a metal sheath, a pair of thermoelement conductors of dissimilar material encased therein, said conductors being approximately equidistant from each other and from the adjacent sheath, the remaining interior of said sheath being packed with a ceramic powder having a negative resistance temperature coefficient. Such structure permits an emf to be generated between said thermoelement conductors (wires) which is a function of the highest temperature occurring along its length. Extension sections 22, are used primarily for economy purposes, or because there is no need to monitor a particular area. Numerous companies manufacture such wire, including one sold under the trademark SERV-RITE. Basically, a sheath would encapsulate a pair of insulated dissimilar material wires. The insulation may be braid, various polyvinyls, TEFLON or other materials, TEFLON being preferred. Said extension wire would be non-sensing and would merely conduct the signal generated by members 21. Connecting adjacent cable sections 21, 22, would be transition elements, such as those manufactured by Gay Engineering & Sales Co., Inc. These cylindrical members have one end necked down, as at 24 to the diameter of member 21, forming a juncture therewith. Such juncture may be silver brazed. After joining the leads from cable sections 21, 22, at 25, the interior of the transition section may be filled with an epoxy potting material which will go from its fluid state to a solid state when cured heating elements. The opposite ends of the entire cable length, including portions 21, 22 and 23, would have its wire conductors 26, 27 (see FIG. 4) electrically connected to one or more components of transmitter bank 30. Transmitter bank 30 is shown in FIG. 4 to include 3 transmitters, 31. Such transmitters may be of the type manufactured by AGM Electronics, Inc., and sold as model No. HPM-4002. They receive the low level signal from the conductors of cable 20 (millivolts D.C.) convert the same into a high level output (4–20 ma D.C.), and transmit said output to components of an alarm bank 40 located remotely from tank 10, via leads 32. The alarm components of bank 40 provide the power input (preferably 24 volt D.C.) required by transmitters 31.

Alarm bank 40 includes a like number (3) alarms 41, such as model 4032 manufactured by AGM Electronics, Inc. These devices utilize the 4–20 ma D.C. signal from the respective transmitters 31, through leads 32, to generate an alarm as a function of such signal, which in turn is a function of the emf generated by the leads from cable 20. Thus, on an appropriate signal being generated by cable 20 and in turn by a transmitter 31, a relay 42 of a communicating alarm 41 would activate a signal 43, such as a bell, light, pulse or the like.

Note that both leads 26, 27 from the lower end (FIG. 4) of cable 20 go to a single transmitter 31. Since the output of said transmitter 31 is a function of the temperature generated within the cable, the signal emitted by said lower transmitter 31 will control activation of its associated alarm 41. Obviously all alarms may be preset as to the threshhold transmitter output at which the alarm activating signal will be generated.

The upper two transmitters (FIG. 4) determine any line break in the conductors of cable 20. It is shown that opposite ends of the same cable conductor wire is electrically linked to the same transmitter. Each such transmitter unit injects a small D.C. current into the wire. If the wire is whole, the respective transmitters 31 will sense the same and generate a 4 ma D.C. current output to their respective alarms 41 and not trip any alarm signal. Should either wire break, then no such small D.C. current will be injected into the respective conductors 26 or 27, which in turn will cause the transmitter output to the respective alarm 41 to to rise to 20 ma D.C., indicating a line break. Thus both excessive temperature and system defects are continuously monitored by this invention.

Although only a single embodiment has been described, it should be obvious that numerous modifications are possible by one skilled in the art without departing from the spirit of the invention the scope of which is limited only by the following claims.

We claim:

1. A heat detection system for monitoring the temperature of a storage tank, said system comprising:
    thermocouple cable means adapted to be positioned adjacent said tank means for generating an emf as a function of the temperature above a threshhold level occurring along the length of said thermocouple cable means, said cable means including;
    (a) alternating cable sections of
        (1) a first pair of spaced thermoelement wires of dissimilar material within a tubular sheath, the interior of said sheath being packed with a first material having a negative resistance temperature coefficient, and
        (2) a second pair of spaced thermoelement wires of dissimilar material within a tubular sheath, the interior of said sheath being packed with a second material other than said first material;
        said second material not having a negative resistance temperature coefficient;
    (b) transition means intermediate each said adjoining cable section for joining said first and second pairs of wires, thereby forming continuous first and second wire lengths;
    means for generating a first warning signal when said temperature exceeds said threshhold level, and
    means for generating a second warning signal as a function of a discontinuity in any of said wires.

2. The system of claim 1, wherein said first signal generating means comprises first transmitter means conductingly connected to one end of both said first and second wire lengths as well as to a first alarm; and said second signal generating means comprises second and third transmitter means, said second transmitter means being conductingly connected both to opposite ends of one of said wire lengths and to a second alarm, and said third transmitter means being conductingly connected to opposite ends of the other of said wire lengths and to a third alarm.

* * * * *